Aug. 26, 1952 — A. KOVALOVSKY ET AL — 2,608,359
CONTROL FOR FISHING REELS
Filed May 9, 1947 — 2 SHEETS—SHEET 1

INVENTOR.
ARTHUR KOVALOVSKY
BY OSCAR KOVALOVSKY
Luther L. Hack
Attorney

Patented Aug. 26, 1952

2,608,359

UNITED STATES PATENT OFFICE 2,608,359

CONTROL FOR FISHING REELS

Arthur Kovalovsky and Oscar Kovalovsky,
Los Angeles, Calif.

Application May 9, 1947, Serial No. 746,948

10 Claims. (Cl. 242—84.5)

This invention relates to fishing reels and a broad object is to provide improved controls for regulating the winding and unwinding of a line on and from a reel, respectively, under the influence of the pull of a caught fish or otherwise.

Reels, especially for deep sea fishing, are provided with so-called "back stops" which prevent unwinding of the line as when a catch is made, and a brake or clutch which is operable for applying friction between a driving handle and the reel so that a line may be payed out or pulled in according to particular requirements.

However, there is disclosed herein and it is a primary object to provide manually operable devices associated with the brake or clutch connecting the operating handle and the reel which, when the brake is set at a desired point for tensioning a line, the brake may be released without changing its retarding factor and may be quickly operated for temporarily allowing the reel to freely rotate. Consequently under such conditions the line is detensioned and the brake is quickly and easily operated for retensioning the line, thereby preventing the loss of a catch by reason of over-tension of the line.

Other objects will appear hereinafter.

There is shown in the accompanying drawings a more or less conventional type of fishing reel embodying our improvements in which.

Figure 3:
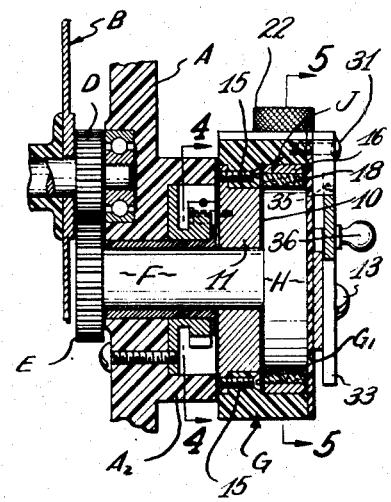
Fig. 3 is a section of the clutch and brake mechanism as seen in the direction of the arrows on line 3—3 of Fig. 2.
Figure 4:
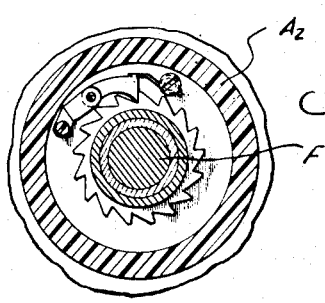
Fig. 4 is a section on line 4—4 of Fig. 3.

A structure adapted to receive the aforesaid improvements includes end housing members A and $A_1$ between and on which a spool B is rotatably supported on a spindle C and carries a pinion D adapted to mesh with a gear E fixed to a driving shaft F (Fig. 3). Member A supports an extension housing G in which a brake or clutch mechanism is housed and includes a drum H and an expansible and contractible band J overlying the drum and rotatable by and with an operating crank K. Housing unit G which encloses the clutch mechanism also rotates with the crank K and abuts an extension $A_2$ on member A. Housing G may have a cover plate $G_1$ attached thereto for enclosing the clutch in a compartment 10 between plate $G_1$ and a partition 11.

Crank K is pivoted to housing G as by means of screw 12 while band J is held in and fixed to said housing as by means of one or more set pins or screws 14. Alining screws 15 are employed for holding band J in operative position on drum H.

Band J has an external split metal portion 16 with spaced radially extended portions 17, 17 and an internal frictional shoe 18 which overlies drum H. A pin 19 carried by crank K and adjustable in a slot 20 in plate $G_1$ engages one of the portions 17 of clutch J while the opposite portion 17 is engaged by an adjustor 22 carried by housing G and is tensioned by a spring 23 which also tends to tension crank K relative to clutch J.

Figure 1:
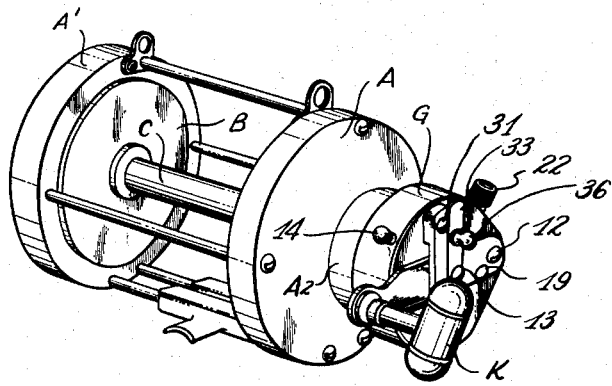
Fig. 1 is a perspective view.
Figure 2:
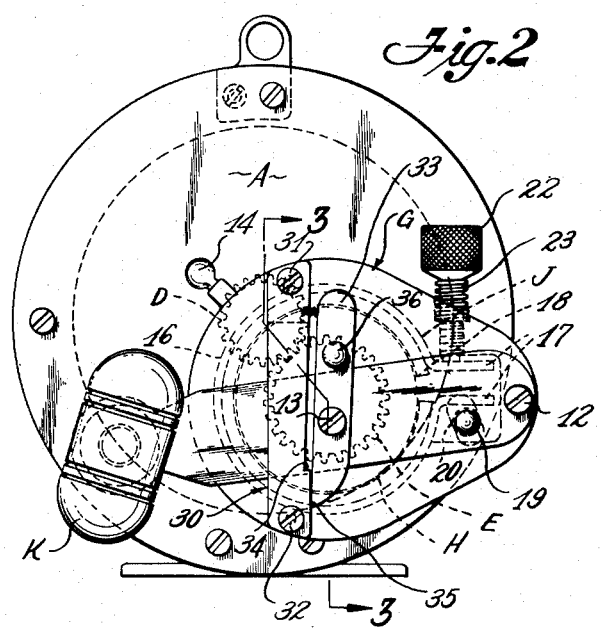
Fig. 2 is a front end view.

Inasmuch as pin 19 engages a portion 17 of band J while adjustor 22 engages the opposite portion 17 when the adjustor 22 is set at a desired point for affording a proper tension on a line, it is obvious that if the crank is moved relative to its engaged portion 17 of the band, the effect of adjustor 22 will be correspondingly changed. So, to relieve the friction between the drum H and band J, crank K is moved in a counterclockwise direction on its pivot 12 as shown in Fig. 2, but if the crank is reversely moved the friction established by adjustor 22 will be resumed.

Figure 5:
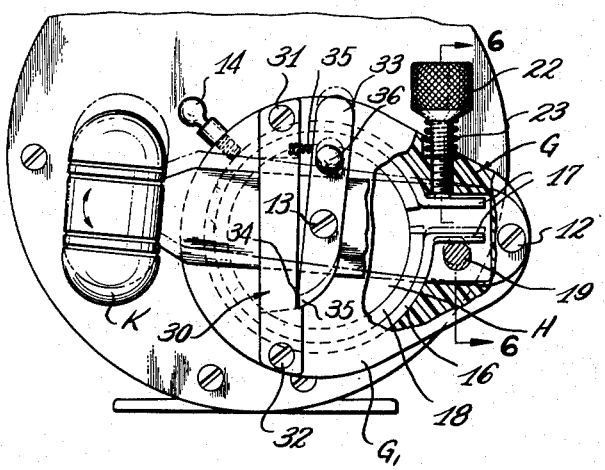
Fig. 5 is a view similar to Fig. 2 except that the release device is locked in reel clutching position and includes a fragmentary sectional portion on line 5—5 of Fig. 3.
Figure 6:
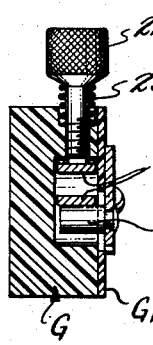
Fig. 6 is a partial section of the brake or clutch on line 6—6 of Fig. 5.
Figure 7:
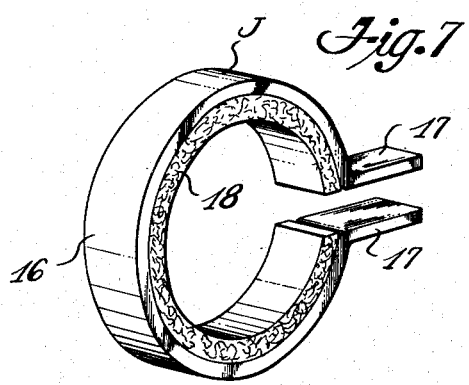
Fig. 7 is a perspective view of a detached brake.

Fig. 5 illustrates best a desirable means for manually releasing or locking the clutch in a previously established state of operation. Such means includes a rigid bar 30 attached to plate $G_1$ as by screws 31 and 32, and a relatively movable latch 33 which may be hinged to crank K on screw 13 or otherwise. Bar 30 has a notch at shoulder 34 engageable with a pawl-like end 35 so that when latched, band J will be locked to drum H and the reel will be likewise retarded in its rotation, depending upon the adjustment of member 22. Latch 33 is urged into latching position by a spring 35 (Fig. 5) and preferably has a pin 36 which is so positioned relative to pin 14 that with the thumb against pin 36 and the first finger against pin 14 the latch may be disengaged from shoulder 34 of bar 30 and thus permit the crank to move in a direction which will free band J from drum H and allow the free rotation of reel B as the line is drawn outwardly by a fish or otherwise. The reel is relatched by holding housing G in one hand and pulling the crank in a clockwise direction by the other hand, after which the adjustor becomes re-effective for providing desired tautness on the line.

In this description we have purposely omitted reference to other types of fishing reels and well known features thereof for some of which, patents have been granted to us but are of public record and are not necessarily or solely pertinent to our herein described invention. Also, it is obvious that no particular materials are required to practise our invention although we have indicated a suitable plastic material in the drawings.

We claim:

1. A fishing reel comprising a frame, a spool rotatable thereon, a clutch housing also rotatable thereon, a clutch in said housing including a drum arranged for rotation with the spool, a crank operatively connected with the spool, an expansible clutch band rotatable with the crank and housing and engageable with the drum, an adjustor for regulating the tensioning of the band on the drum, and a declutching device including a fixed member secured to the housing and a relatively movable latch pivotally mounted on the crank and at all times rotatable with the crank and with said fixed member so that when the latch is engaged with the associated fixed member a predetermined tension may be applied to the spool for retarding the rotation thereof, said crank having a portion engageable with said band whereby when the latch is released from said fixed member the spool may freely rotate on its axis without impairing the adjustment of the clutch, and subsequently reengaging the fixed member and retarding the rotation of the spool, said crank being adjustable on its mounting for regulating the application of said band to said drum.

2. A fishing reel comprising a frame, a spool rotatable thereon, a clutch housing rotatable on the frame, a driving mechanism including a crank pivoted to the housing and also rotatable therewith, a clutch including a drum in said housing arranged for rotation with the spool, said crank being operatively connected with the spool, an expansible clutch band rotatable with the crank and engageable with the drum, an adjustor for regulating the tensioning of the band on the drum, and a declutching device including a fixed member secured to the housing and a relatively movable latch mounted on and at all times rotatable with the crank and with said fixed member so that when the latch is engaged with the associated fixed member a predetermined tension may be applied to the spool for retarding the rotation thereof, said crank having a portion engageable with said band whereby when the latch is released from said fixed member the spool may freely rotate on its axis without impairing the adjustment of the clutch, said crank being adjustable on its mounting for regulating the application of the band to the drum, said driving and clutch mechanisms being mounted in the housing rotatable with the crank and on which the crank is supported and is adjustable for releasing the clutch from the spool.

3. In combination with a fishing reel, a housing rotatable on the reel frame, a clutch enclosed in said housing and including a drum drivingly connected with the reel, and a friction band rotatable with the housing and engaging said drum, a crank eccentrically pivoted on and for rotating said housing and said band, an adjustor on the housing for tensioning the band on the drum, and a latch for controlling the application of the band to the drum and including a member fixed to the housing, and a latching member pivotally carried by the crank and arranged for engagement with the fixed member, said crank having engagement with said clutch band whereby when the latching member is disengaged from its associated fixed member by movement of the crank relative to said housing, the band is thoroughly released from fixed frictional engagement with the reel drum without impairing a previously established adjustment of the band.

4. A control mechanism for fishing reels including a rotatable housing, a frictional brake band carried by said housing, a drum drivingly connected with the reel and adapted to frictionally engage said band, an adjustor carried by said housing and having a portion engaging a portion of said band for varying the frictional engagement of the band on the drum, a crank pivotally mounted on and for rotating said housing and having means thereon for engagement with an opposite portion of said band, and a latching member yieldably carried by said crank, a second latching member fixed to said housing and adapted to be engaged by the yieldable latching member whereby when the yieldable latching member is engaged with the fixed latching member on said housing, the brake band may be frictionally engaged with said drum so that the rotation of the drum and reel will be retarded until said latch is manually released for allowing the reel to freely rotate without impairing a previously established setting of the clutch.

5. A control mechanism for fishing reels as characterized in claim 4 including members fixed to said housing and to said yieldable latching member, respectively, and relatively disposed so that when said members are manually urged one toward the other the yieldable latching member will be disengaged from the fixed latching member.

6. In a fishing reel: a frame, a spool rotatable thereon, a housing rotatable on said frame on an axis offset from the axis of said spool and geared to said spool, a clutch borne by said housing and including a brake band and a drum, said drum being drivingly connected with said spool, a crank pivoted to said housing and arranged when turned to bodily rotate said clutch and also said spool and arranged to engage the clutch when pivoted in one direction relative to the housing, an adjustor on said housing for regulating frictional engagement of said band with said drum, and a latch including a member fixed to the housing and a yieldable member on said crank arranged to be latched when said crank is pivoted in said one direction on said housing, for operatively holding said clutch engaged.

7. In a fishing reel: a frame, a spool rotatable thereon, a housing rotatable on said frame on an axis offset from the axis of said spool and geared to said spool, a clutch borne by said housing and including a brake band and a drum, said drum being drivingly connected with said spool, a crank pivoted to said housing and arranged when turned to bodily rotate said clutch and also said spool and arranged to engage the clutch when pivoted in one direction relative to the housing, an adjustor on said housing for regulating frictional engagement of said band with said drum, and a latch including a member fixed to the housing and a yieldable member on said crank arranged to be latched when said crank is pivoted in said one direction on said housing, for operatively holding said clutch engaged, and a ratchet mechanism in said housing for preventing rotation of the spool in a reverse direction which would permit unwinding of the line from the spool.

8. In a fishing reel: a frame, a spool rotatable thereon, a housing rotatable on said frame on an axis offset from the axis of said spool and geared to said spool, a clutch borne by said housing and including a brake band and a drum, said drum being drivingly connected with said spool, a crank pivoted to said housing and arranged when turned to bodily rotate said clutch and also said spool and arranged to engage the clutch when pivoted in one direction relative to the housing, an adjustor on said housing for regulating frictional engagement of said band with said drum, and a latch including a member fixed to the housing and a yieldable member on said crank arranged to be latched when said crank is pivoted in said one direction on said housing, for operatively holding said clutch engaged, said crank bearing means cooperating with said adjustor for engaging and holding said band locked to said drum when said latching members are engaged.

9. In a fishing reel: a frame, a spool rotatable thereon, a housing rotatable on said frame on an axis offset from the axis of said spool and geared to said spool, a clutch borne by said housing and including a brake band and a drum, said drum being drivingly connected with said spool, a crank pivoted to said housing and arranged when turned to bodily rotate said clutch and also said spool and arranged to engage the clutch when pivoted in one direction relative to the housing, an adjustor on said housing for regulating frictional engagement of said band with said drum, and a latch including a member fixed to the housing and a yieldable member on said crank arranged to be latched when said crank is pivoted in said one direction on said housing, for operatively holding said clutch engaged, said crank bearing means cooperating with said adjustor for engaging and holding said band locked to said drum when said latching members are engaged, said latching members being disengaged and said band being released from said drum by swinging the crank in a given direction on the clutch housing.

10. In a fishing reel: a frame, a spool rotatable thereon, a housing rotatable on said frame on an axis offset from the axis of said spool and geared to said spool, a clutch borne by said housing and including a brake band and a drum, said drum being drivingly connected with said spool, a crank pivoted to said housing and arranged when turned to bodily rotate said clutch and also said spool and arranged to engage the clutch when pivoted in one direction relative to the housing, an adjustor on said housing for regulating frictional engagement of said band with said drum, and a latch including a member fixed to the housing and a yieldable member on said crank arranged to be latched when said crank is pivoted in said one direction on said housing, for operatively holding said clutch engaged, said crank bearing means cooperating with said adjustor for engaging and holding said band locked to said drum when said latching members are engaged, said crank serving to at times rotate the housing and clutch in either forward or reverse directions on said frame independently of and with said spool, depending upon the engagement or disengagement of said band and said drum.

ARTHUR KOVALOVSKY.
OSCAR KOVALOVSKY.

REFERENCES CITED

The following references are of record in the file of this patent:

UNITED STATES PATENTS

| Number | Name | Date |
| --- | --- | --- |
| 1,958,919 | Kovalovsky | May 15, 1934 |
| 2,096,299 | Grieten | Oct. 19, 1937 |